United States Patent
Bruechmann et al.

(10) Patent No.: US 9,548,623 B2
(45) Date of Patent: Jan. 17, 2017

(54) METHOD AND DEVICE FOR COMMUNICATION WITH A PERSONAL ELECTRONIC DEVICE IN AN AIRCRAFT

(71) Applicant: Airbus Operations GmbH, Hamburg (DE)

(72) Inventors: Gerd Bruechmann, Buchholz (DE); Ulrich Rittner, Hamburg (DE)

(73) Assignee: Airbus Operations GmbH (DE)

( * ) Notice: Subject to any disclaimer, the term of this patent is extended or adjusted under 35 U.S.C. 154(b) by 190 days.

(21) Appl. No.: 14/465,881

(22) Filed: Aug. 22, 2014

(65) Prior Publication Data

US 2015/0061587 A1    Mar. 5, 2015

(30) Foreign Application Priority Data

Aug. 30, 2013    (EP) .................... 13 182 434

(51) Int. Cl.
| | |
|---|---|
| *H02J 7/00* | (2006.01) |
| *H02J 7/02* | (2016.01) |
| *H04B 5/00* | (2006.01) |
| *H04B 7/185* | (2006.01) |
| *H02J 5/00* | (2016.01) |

(52) U.S. Cl.
CPC ............. *H02J 7/025* (2013.01); *H02J 5/005* (2013.01); *H04B 5/0031* (2013.01); *H04B 5/0037* (2013.01); *H04B 5/0075* (2013.01); *H04B 7/18506* (2013.01)

(58) Field of Classification Search
CPC ......... H02J 5/005; H02J 7/025; H04B 5/0031; H04B 5/0037; H04B 5/0075; H04B 7/18506; H04L 67/125; H04M 1/72569
See application file for complete search history.

(56) References Cited

U.S. PATENT DOCUMENTS

| | | | |
|---|---|---|---|
| 2011/0050164 A1 | 3/2011 | Partovi et al. | |
| 2012/0329405 A1* | 12/2012 | Lee .......... | H02J 17/00 455/73 |
| 2013/0119929 A1 | 5/2013 | Partovi | |
| 2013/0157565 A1 | 6/2013 | Clement et al. | |
| 2013/0304583 A1* | 11/2013 | Han ............. | G06Q 30/0267 705/14.64 |

FOREIGN PATENT DOCUMENTS

WO    2013/045501 A1    4/2013

OTHER PUBLICATIONS

Search Report (EP 13 182 434.4)(Jan. 17, 2014).

* cited by examiner

*Primary Examiner* — Vuthe Siek
(74) *Attorney, Agent, or Firm* — Lerner, David, Littenberg, Krumholz & Mentlik, LLP

(57) ABSTRACT

A communication module includes a communication module, having an inductive energy transfer unit, a transfer driver coupled to the inductive energy transfer unit and configured to generate driver signals for operating the inductive energy transfer unit, a charging processor coupled to the transfer driver and configured to control the inductive energy transfer unit to operate in an inductive power charging operation mode, and a communication processor coupled to the transfer driver and configured to control the inductive energy transfer unit to operate in a near field communication (NFC), operation mode.

8 Claims, 1 Drawing Sheet

METHOD AND DEVICE FOR COMMUNICATION WITH A PERSONAL ELECTRONIC DEVICE IN AN AIRCRAFT

FIELD OF THE INVENTION

The present invention pertains to a method and a device for communication with a personal electronic device in an aircraft, in particular by utilizing near field communication.

BACKGROUND OF THE INVENTION

Personal electronic devices (PEDs) have become increasingly widespread. Usually those PEDs get carried around along with the user wherever he travels, including on board of aircraft. Considering the manifold communication interfaces which such PEDs comprise it is desirable to provide passengers on board an aircraft with access to the different networks of the aircraft, for example a wireless local area network (WLAN).

PEDs often incorporate near field communication (NFC) circuitry comprising NFC chips and corresponding antennas. NFC is a wireless technology allowing two NFC-enabled devices to wirelessly communicate over a short distance of several centimeters. NFC is standardized internationally within NFC Forum specifications and defined in, for example, ISO/IEC 18092, ISO/IEC 18000-3, ISO/IEC 21481, ECMA-340, ISO 14443, and the like. A main application area for NFC technology is contactless, short-range communications on the basis of radio frequency identification (RFID) standards. NFC utilizes electromagnetic field induction that enables communication between PEDs such as laptops, mobile phones, smartphones, tablet PCs and the like.

The document US 2013/0157565 A1 discloses a near field communication (NFC) antenna in a mobile device which is used to wirelessly charge a battery in the mobile device by placing the mobile device on, or in very close proximity to, a charging station that emits an electromagnetic field.

The document US 2013/0119929 A1 discloses a system and method for providing a multidimensional charger for a mobile device.

BRIEF SUMMARY OF THE INVENTION

It is one idea of the invention to facilitate coupling of aircraft passengers' PEDs to various interfaces of an aircraft, thereby allowing them to utilize different functionalities of the aircraft through a single communication interface.

An aspect of the invention therefore pertains to a communication module, comprising a communication module, comprising an inductive energy transfer unit, a transfer driver coupled to the inductive energy transfer unit and configured to generate driver signals for operating the inductive energy transfer unit, a charging processor coupled to the transfer driver and configured to control the inductive energy transfer unit to operate in an inductive power charging operation mode, and a communication processor coupled to the transfer driver and configured to control the inductive energy transfer unit to operate in a near field communication, NFC, operation mode.

Furthermore, another aspect of the invention therefore pertains to a method for providing communication between a PED and a communication module, the method comprising initiating communication between a near field communication unit of the PED and a inductive energy transfer unit of the communication module; selecting a charging processor of the communication module to control the inductive energy transfer unit to operate in an inductive power charging operation mode, if a battery of the PED is to be wirelessly charged; and selecting a communication processor to control the inductive energy transfer unit to operate in a near field communication, NFC, operation mode, if the PED is to receive and/or send data signals from or to the communication module.

Another idea of the present invention is to provide a unified communication module for use in an aircraft, particularly aircraft seats, which is able to provide multiple functions for a personal electronic device of a passenger of the aircraft. Specifically, the communication module combines NFC functionality with wireless charging functionality using unified inductive energy transfer means within the communication module.

According to an embodiment of the communication module, the communication module may further comprise a receptacle configured to accommodate a personal electronic device, PED, having a NFC unit which comes to rest in the vicinity of the inductive energy transfer unit when being accommodated in the receptacle.

According to a further embodiment of the communication module, the charging processor may be configured to output control signals to the transfer driver adapted to charge a battery of the PED via inductive energy transfer between the inductive energy transfer unit and the NFC unit.

According to a further embodiment of the communication module, the communication processor may be configured to output control signals to the transfer driver adapted to initiate NFC between the communication module and the PED by way of inductive signal transfer between the inductive energy transfer unit and the NFC unit.

Optionally, the communication processor may then be further configured to allocate a network authentication code to the PED via NFC for accessing a wireless network.

According to a further embodiment of the communication module, the communication processor may further be configured to access a wireless communication unit or the PED via NFC. Particularly, the wireless communication unit may then be a Bluetooth® communication unit.

According to an embodiment of the method, the method may further comprise allocating, by the communication processor, a network authentication code to the PED via NFC; and accessing, by the PED, a wireless network using the allocated network authentication code.

According to a further embodiment of the method, the method may further comprise accessing, by the communication processor, a wireless communication unit or the PED via NFC.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessar- FIG. 1 schematically illustrates a portion of the passenger cabin within an aircraft having seats with a communication module according to an embodiment of the invention.

Figure 1:
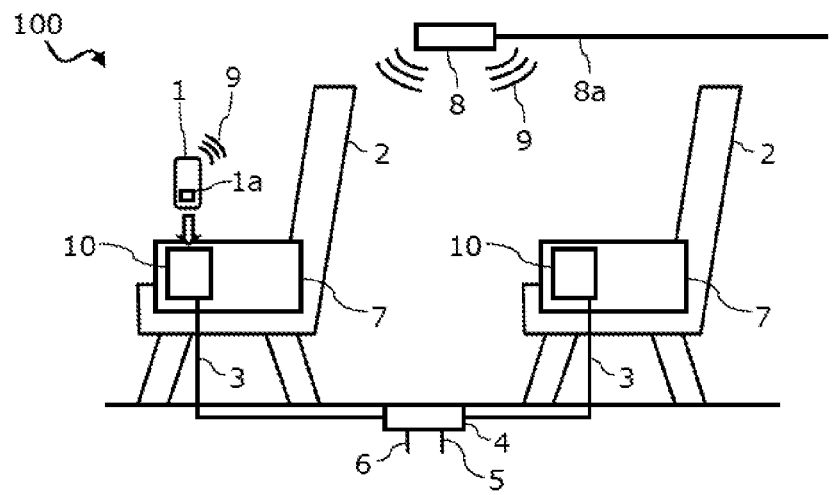

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Personal electronic devices (PEDs) within the meaning of the present invention comprise all electronic devices which may be employed for entertainment, communication and/or office purposes. For example, PEDs may comprise all sorts of end terminals, such as laptops, mobile phones, smartphones, handheld devices, palmtops, tablet PCs, GPS device, navigation devices, audio devices such as MP3 players, portable DVD or Bluray® players or digital cameras.

Near Field Communication (NFC) within the meaning of the present invention includes any type or kind of contactless communication between two communication terminals which may be located in the vicinity with respect to each other and which may be able to temporarily exchange information or data by means of a predefined communication protocol. For example, the spatial distance between the communication terminals which enables the exchange of information or data may be in the range of several centimeters, such as less than 15 cm, in particular, less than 10 cm, more particularly less than 5 cm. NFC within the meaning of the present invention may be imparted to the communication terminals by means of RFID chips, transceiver antennae, transceiver solenoids or similar transmission/reception components. For example, NFC may be conveyed between an actively connecting component and a passive component or between two actively connecting components, i.e. in a so-called peer-to-peer operating mode.

Seats within the meaning of the present invention may comprise any form of structural components intended to host a passenger for the duration of a flight of an aircraft, the seat being a location which may be used personally and at least temporarily exclusively by the passenger of the aircraft during the flight. Seats within the meaning of the invention may be aircraft seats, but also loungers, armchairs, beds, suites of the first or royal class or similar seating furniture within an aircraft.

FIG. 1 schematically shows an illustration of a part of a passenger cabin 100 in an aircraft with multiple seats 2. Each of the seats 2 may comprise armrests 7 at which a communication module 10 may be arranged. The armrests 7 may for example comprise a hinge to hingedly affix the communication module thereto. The communication module 10 may comprise a tray or receptacle that may be arranged to swing open around the hinge and to allow placement of a PED 1 therein. After closing the tray or receptacle the PED 1 may be put into a charging and communicating position with respect to the active components within the communication module 10. It may for example be possible to put the PED 1 in a downwards motion in the tray or receptacle, similar to bread being put into an upright bread toasting device, with the long side of the PED 1 facing downwards and the flat or display side facing towards or away from the flat side of the armrest 7. Of course, it may also be possible to arrange the communication module 10 at a different position at the seat 2 or in the vicinity around the seat 2. For example, the communication module 10 may also be integrated into a tray table of a back rest of a seat 2.

The PED 1 may for example comprise a Near Field Communication unit 1a, NFC unit, which may be arranged near to a NFC solenoid within the communication module 10 when the PED 1 is properly placed into the tray or receptacle of the communication module 10.

The PED 1 may also be in radio communication 9 with a wireless network of the aircraft. The wireless network may for example be accessible via a network device 8 such as a router, an access point or similar and a corresponding network line 8a. The wireless network may for example be a WiFi network, a wireless local area network, a UMTS network, a GSM network, a WiMax network, a ZigBee network or any similar suitable network type for wireless radio communication. Passengers connected to the wireless network of the aircraft may for example use network functions via their PED 1 such as in-flight entertainment (IFE) functions, email access, internet access or wireless control functionality of facilities in the aircraft such as calling a steward, ordering items of the aircraft shop, remotely adjusting the seat or the like.

The communication modules 10 may each be connected via a connection line 3, or alternatively wirelessly, to a central control unit 4 which may for example be arranged in the cabin floor, a galley device or any similar suitable place within the aircraft. The central control unit 4 may be equipped with a power line 5 to draw power from aircraft internal power sources, such as a 28 VDC power network of the aircraft, and distribute it to the individual communication modules 10. The central control unit 4 may also comprise a data line 6 by means of which control signals, configuration data or data signals may be provided to and from the individual communication modules 10.

Figure 2:
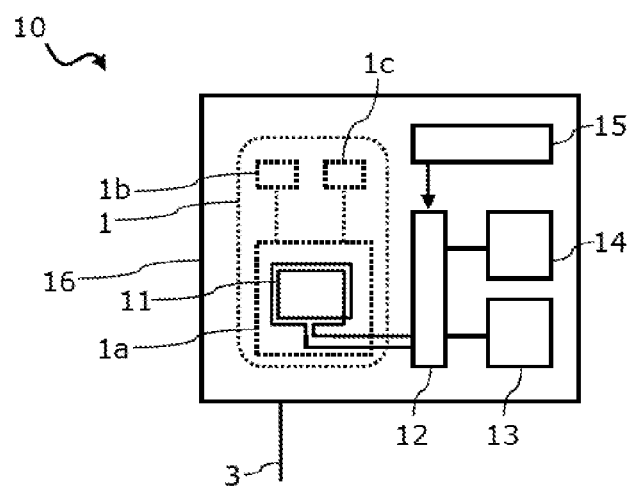
FIG. 2 schematically illustrates a communication module according to a further embodiment of the invention.

FIG. 2 shows a schematic illustration of a communication module 10, for example a communication module as being utilized in the passenger cabin 100 of an aircraft shown and explained with respect to FIG. 1.

A PED 1—shown in dashed lines to indicate that it is accommodated within the tray or receptacle 16 of the communication module 10—may comprise a NFC unit 1a, a battery 1b and a wireless communication unit 1c. The wireless communication unit 1c may for example be a Bluetooth® device, a firewire interface terminal, a serial interface terminal or any other interface device with which the PED 1 may establish a communication with external devices according to a given communication protocol.

The PED 1 may be arranged within the receptacle so that the NFC unit 1a is placed in vicinity of an inductive energy transfer unit 11 of the communication module 10. The inductive energy transfer unit 11 may for example be a solenoid or a coil 11. The communication module 10 may be configured to perform inductive power coupling to allow energy to be transferred from a power supply of the communication module 10 to the battery 1b of the PED 1 without the need for a wire-bound connection therebetween. Across the inductive energy transfer unit 11 an oscillating electric potential may be applied which sets up an oscillating magnetic field in the vicinity of the solenoid 11. The oscillating magnetic field may induce a secondary oscillating electrical potential in a coil within the NFC unit 1c placed close to the inductive energy transfer unit 11, thereby transmitting electrical energy from the inductive energy transfer unit 11 to the NFC unit 1c by electromagnetic induction without a conductive connection between the solenoid 11 and the coil of the NFC unit 1c. The inductive energy transfer unit 11 may be adapted to generate an electromagnetic field suitable to induce a current in a coil of the NFC unit 1a.

The inductive energy transfer unit 11 may be driven by a transfer driver 12 which in turn may be controlled by a charging processor 14. The charging processor 14 may be adapted to control the charging functionality of the inductive energy transfer unit 11 by issuing respective control signals to the transfer driver 12. For example, the charging processor 14 may be adapted to communicate with the PED 1 according to the Qi standard to initiate a wireless charging process.

At the same time, the transfer driver 12 may also be controlled by a communication processor 13 which may facilitate near-field communication of the communication module 10 with the PED 1. It may be possible for the communication processor to be implemented as system-on-ship (SoC) component including a computing processor and a memory element. It may also be possible to implement the communication processor as application-specific integrated circuit (ASIC), field-programmable gate array (FPGA), programmed logic device (PLD) or any other suitable electronic circuitry.

The communication module 10 further includes a control processor 15 which may be coupled to the transfer driver 12 and which may be adapted to control whether the transfer driver 12 is to be driven in charging mode, i.e. under the control of the charging processor 14, or in communication mode, i.e. under control of the communication processor 12. The control processor 15 may be a microcontroller, a FPGA, an ASIC, a PLD or any similar electronic circuitry configured to detect in which operating mode the transfer driver 12 should be operated.

The communication modules 10 may each by assigned to a specific one of the seats 2 in FIG. 1. In particular, each of the seats 2 may be equipped with a communication module 10. The allocation of seats to communication modules may be predetermined when installing the communication modules 10 and hardcoded into one or more of the processors of the communication modules 10. It may also be possible to dynamically allocate a seat 2 to one of the communication modules 10 by means of the central control unit 4.

The PED 1 may be identified with the communication module 10 and be assigned an access code or authentication for the wireless network 8 at the same as the PED 1 initiates communication with the communication module 10 via NFC. In particular, the wireless network connection to the PED 1 may already be set up by the communication processor 13 which may access the respective network component in the PED 1 via the inductive energy transfer unit 11 and the NFC unit 1a.

The assignment of the wireless network connection for the PED 1 may in particular be seat-bound via the allocation of the respective network-enabling communication module 10 to one of the seats 2. The wireless network connection may then be used, for example, to stream video content from the in-flight entertainment service (IFE) on the PED 1 or to gain access to the cabin intercommunication system (CIDS) of the aircraft.

It may also be possible to identify the user of the PED 1 or the PED 1 via the NFC communication with the communication module 10 and set up a Bluetooth® (a wireless technology standard for exchanging data over short distances, for example, using short-wavelength UHF radio waves) connection to other external units or components, such as a Bluetooth® headphone, a Bluetooth® enabled network component of the CIDS, a Google®Glass (a type of wearable technology with an optical head-mounted display) or any other similar device.

The communication module 10 may be adapted to authenticate the PED 1 for access to the wireless network 8. Thus, the communication processor 13 may be configured to request authentication information from the PED 1 via NFC, for example a PIN code, a password, a booking or reservation number or similar data which the user of the PED 1 may provide. Alternatively, the communication processor 13 may initiate the authentication automatically by fetching authentication information from the PED 1 by itself, such as a MAC address, an IP address, a device PIN, a SIM code or similar identification information.

Figure 3:
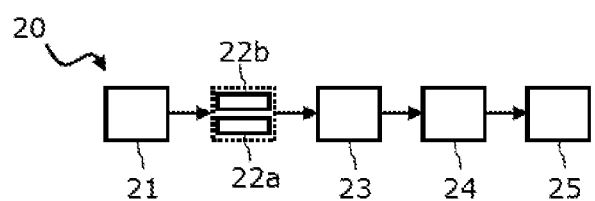
FIG. 3 schematically illustrates a method for providing communication between a PED and a communication module according to a further embodiment of the invention.

FIG. 3 shows a schematic illustration of a method 20 for communication with a personal electronic device, PED, in an aircraft, in particular utilizing a communication module 10 as shown in FIGS. 1 and 2 and a PED 1 as shown in FIGS. 1 and 2.

The method 20 comprises as a first step 21 initiating communication between a near field communication unit 1a of the PED 1 and an inductive energy transfer unit 11 of the communication module 10. Depending on the desired operation mode, a control processor 15 may then select one of a charging processor 14 and a communication processor 13 of the communication module 10 to control a transfer driver 12 of the communication module for respective control of the inductive energy transfer unit 11. Particularly, in a step 22a, the charging processor 14 may be selected to control the inductive energy transfer unit 11 to operate in an inductive power charging operation mode, if a battery 1b of the PED 1 is to be wirelessly charged. On the other hand, in a step 22b, the communication processor 13 may be selected to control the inductive energy transfer unit 11 to operate in a near field communication, NFC, operation mode, if the PED 1 is to receive and/or send data signals from or to the communication module 10.

Optionally, in a step 23 the communication processor 13 may allocate a network authentication code to the PED 1 via NFC using the inductive signal transfer between the inductive energy transfer unit 11 and the NFC unit 1a of the PED 1. That way, the PED 1 may in a step 24 be able to access a wireless network 8 of the aircraft, for example a WLAN, using the allocated network authentication code.

Moreover, in an optional step 25, the communication processor 13 may access a wireless communication unit 1c of the PED 1 via NFC. The wireless communication unit 1c may for example be a Bluetooth® communication device which may then be used by the PED 1 to gain access to further Bluetooth® enabled external apparatuses, such as headphones, Google®Glasses, cabin systems of the aircraft or similar components.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A communication module, comprising:
   an inductive energy transfer unit;
   a transfer driver coupled to the inductive energy transfer unit and configured to generate driver signals for operating the inductive energy transfer unit;
   a charging processor coupled to the transfer driver and configured to control the inductive energy transfer unit to operate in an inductive power charging operation mode; and
   a communication processor coupled to the transfer driver and configured to control the inductive energy transfer unit to operate in a near field communication (NFC), operation mode,
   wherein the communication processor is further configured to allocate a network authentication code to a personal electronic device (PED) via NFC for accessing a wireless network.

2. The communication module according to claim 1, further comprising:
   a receptacle configured to accommodate the PED, having a NFC unit which comes to rest in the vicinity of the inductive energy transfer unit when being accommodated in the receptacle.

3. The communication module according to claim 2, wherein the charging processor is configured to output control signals to the transfer driver adapted to charge a battery of the PED via inductive energy transfer between the inductive energy transfer unit and the NFC unit.

4. The communication module according to claim 2, wherein the communication processor is configured to output control signals to the transfer driver adapted to initiate NFC between the communication module and the PED by way of inductive signal transfer between the inductive energy transfer unit and the NFC unit.

5. The communication module according to claim 4, wherein the communication processor is further configured to access a wireless communication unit or the PED via NFC.

6. The communication module according to claim 5, wherein the wireless communication unit is a Bluetooth® communication unit.

7. A method for providing communication between a personal electronic device (PED), and a communication module, the method comprising:
   initiating communication between a near field communication unit of the PED and an inductive energy transfer unit of the communication module;
   selecting a charging processor of the communication module to control the inductive energy transfer unit to operate in an inductive power charging operation mode, if a battery of the PED is to be wirelessly charged;
   selecting a communication processor to control the inductive energy transfer unit to operate in a near field communication (NFC), operation mode, if the PED is to receive and/or send data signals from or to the communication module;
   allocating, by the communication processor, a network authentication code to the PED via NFC; and
   accessing, by the PED, a wireless network using the allocated network authentication code.

8. The method according to claim 7, further comprising:
   accessing, by the communication processor, a wireless communication unit or the PED via NFC.

* * * * *